(12) United States Patent
Polen et al.

(10) Patent No.: US 12,492,507 B2
(45) Date of Patent: Dec. 9, 2025

(54) COMPOSITE NONWOVEN MAT WITH COATING LAYER

(71) Applicant: Owens Corning Intellectual Capital, LLC, Toledo, OH (US)

(72) Inventors: Shane M. Polen, Columbus, OH (US); Benjamin J. Kowalski, Gahanna, OH (US); Jianhui Wu, Westerville, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 321 days.

(21) Appl. No.: 17/773,971

(22) PCT Filed: Dec. 1, 2020

(86) PCT No.: PCT/US2020/062647
§ 371 (c)(1),
(2) Date: May 3, 2022

(87) PCT Pub. No.: WO2021/113203
PCT Pub. Date: Jun. 10, 2021

(65) Prior Publication Data
US 2022/0380975 A1 Dec. 1, 2022

Related U.S. Application Data

(60) Provisional application No. 62/944,784, filed on Dec. 6, 2019.

(51) Int. Cl.
*D06M 23/00* (2006.01)
*D04H 1/4218* (2012.01)
*D04H 1/587* (2012.01)

(52) U.S. Cl.
CPC ........ *D06M 23/005* (2013.01); *D04H 1/4218* (2013.01); *D04H 1/587* (2013.01)

(58) Field of Classification Search
None
See application file for complete search history.

(56) References Cited

U.S. PATENT DOCUMENTS

| | | | |
|---|---|---|---|
| 4,734,321 | A | 3/1988 | Radvan et al. |
| 6,777,482 | B2 | 8/2004 | Grove et al. |

(Continued)

FOREIGN PATENT DOCUMENTS

| | | |
|---|---|---|
| EP | 686494 A2 | 12/1995 |
| EP | 2985374 A1 | 2/2016 |

(Continued)

OTHER PUBLICATIONS

English translation of Yamanaka et al. (JP 2017-043003). (Year: 2017).*

(Continued)

*Primary Examiner* — Ronak C Patel
(74) *Attorney, Agent, or Firm* — Calfee, Halter & Griswold LLP

(57) ABSTRACT

A composite nonwoven mat and a method of making a composite nonwoven mat are provided. The composite nonwoven mat includes a nonwoven base layer having a first surface and a second surface, and a coating layer formed on, penetrating into, and adhered to the first surface of the nonwoven base layer. The coating layer includes a polymer material and a carrier composition. The composite nonwoven mat has an average Gurley porosity of at least 500 seconds.

13 Claims, 1 Drawing Sheet

(56) References Cited

U.S. PATENT DOCUMENTS

| | | |
|---|---|---|
| 7,445,837 B2 | 11/2008 | Bopp |
| 7,824,762 B2 | 11/2010 | Ziegler |
| 8,187,418 B2 | 5/2012 | Kajander et al. |
| 8,486,516 B2 | 7/2013 | Hauber et al. |
| 2004/0029469 A1* | 2/2004 | Anderson ............... B32B 3/00 442/76 |
| 2004/0161993 A1* | 8/2004 | Tripp .................... C04B 26/02 442/364 |
| 2006/0292948 A1 | 12/2006 | Geel et al. |
| 2007/0141931 A1 | 6/2007 | Nandi et al. |
| 2008/0176050 A1 | 7/2008 | Lintz et al. |
| 2010/0143684 A1 | 6/2010 | Geel et al. |
| 2017/0282510 A1 | 10/2017 | Peet et al. |
| 2017/0341337 A1* | 11/2017 | Kirkwood ............... E04C 2/043 |

FOREIGN PATENT DOCUMENTS

| | | |
|---|---|---|
| GB | 1411148 A | 10/1975 |
| WO | 2006111458 A1 | 10/2006 |
| WO | 2019221863 A1 | 4/2019 |
| WO | 2020210061 A1 | 10/2020 |

OTHER PUBLICATIONS

International Search Report and Written Opinion from PCT/US2020/062647 dated Mar. 15, 2021.

Office Action from EP Application No. 20828475.2 dated Aug. 14, 2023.

Office Action from EP Application No. 20828475.2 dated Apr. 3, 2023.

Office Action from CN Application No. 202080083965.5 dated Oct. 12, 2023.

Office Action from CN Application No. 202080083965.5 dated Aug. 30, 2023.

Office Action from CN Application No. 202080083965.5 dated Mar. 9, 2023.

* cited by examiner

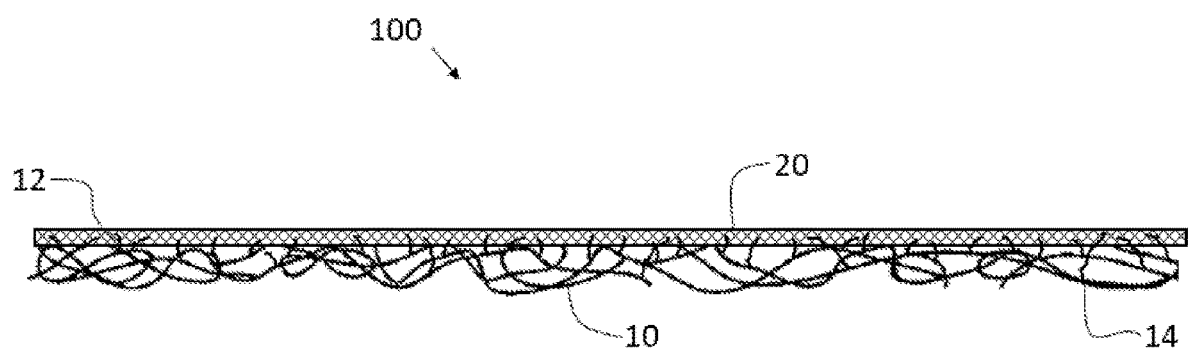

COMPOSITE NONWOVEN MAT WITH COATING LAYER

CROSS-REFERENCE TO RELATED APPLICATIONS

This application is the U.S. national stage entry of PCT/US2020/062647, filed on Dec. 1, 2020, which claims priority to and all benefit of U.S. Provisional Patent Application No. 62/944,784, filed on Dec. 6, 2019, the entire contents of which is are fully incorporated herein by reference.

FIELD

The general inventive concepts relate to non-woven fibrous mats and, more particularly, to composite nonwoven fibrous mats that include a thermoplastic polymer coating.

BACKGROUND

Conventional glass fibers are useful in a variety of applications including reinforcements, building materials, textiles, and acoustical and thermal insulation materials. Nonwoven mats may be made from the fibers by conventional wet-laid processes, wherein wet chopped fibers are dispersed in a water slurry that contains surfactants, viscosity modifiers, defoaming agents, and/or other chemical agents. The slurry containing the fibers is delivered onto a moving screen where a substantial portion of the water is removed, leaving behind a web comprising the fibers and the various chemical agents in the slurry adhered to the fibers. A binder is then applied to the web, and the resulting mat is dried to remove any remaining water and cure the binder. The formed nonwoven mat is an assembly of dispersed, individual chopped fibers.

The binder composition works as an adhesive to bind the fibers together to form a cohesive product, while also improving the product's properties, such as form recovery, stiffness, acoustical openness, porosity, and structure.

Wall boards, such as gypsum or foam composite board panels, are used in building construction to form the partitions or walls of rooms, hallways, ceilings, and the like. Similar boards are also used in exterior wall or roof construction, such as sheathing or roof deck. Such composite boards may include facing or back mats, such as fiberglass or other woven or nonwoven mats, on one or both faces to enhance the performance properties of the board, such as board strength, rigidity, weather durability, and moisture or mold resistance. Such woven or nonwoven mats may be manufactured in-line with the wall board or independently thereof.

Conventional nonwoven mats generally have a porous structure such that materials, particularly liquid materials, applied to the nonwoven mats tend to bleed through from one surface of the nonwoven mat to the opposing surface of the nonwoven mat. Various solutions have been attempted to combat bleed through, including the use of coating layers applied onto the nonwoven mats.

Lightweight products that efficiently seal off the barrier between environment and underlying board are desirable. Conventional coating compositions include various formulations that typically include mineral pigments, organic binder, and fillers, including calcium carbonate, dixie clay, and the like. These minerals are typically bound together with a polymer binder such as an acrylic. Although such coating compositions are useful in preventing bleed through, application of such compositions requires additional processing equipment, time, and a significant applied weight to achieve improved properties. Further, when applied with traditional methods, including knife over plate and knife over roll, much higher coat weights are required to significantly improve the Gurley porosity of the barrier. Accordingly, it would be desirable to provide more cost and time effective solutions to reducing the porosity and bleed through in nonwoven mats and mat-faced panels.

SUMMARY

A composite nonwoven mat is described herein, and in accordance with various embodiments, may include a nonwoven base layer formed from a plurality of fibers held together by a binder, the nonwoven base layer having a first surface and a second surface, and a coating layer adhered to the first surface. In various embodiments, the coating layer includes a coating composition, which can include a polymer material in a carrier composition. In various embodiments, the coating layer extends partially into the nonwoven base layer. In various embodiments, the composite nonwoven mat has an average Gurley porosity of at least 500 seconds. In various embodiments, the nonwoven base layer can include glass fibers. In various embodiments, the polymer material can include one or more of a polyolefin, a polyester, a polyamide, a polyimide, a polyacrylate, and a polyurethane. In various embodiments, the polymer material can include one or more of a polyethylene, a polypropylene, and a polymethacrylate. In various embodiments, the carrier composition can be a polyvinyl alcohol, a polyvinyl acetate, a styrene butadiene, a polyvinyl pyrrolidone, a polyacrylic acid, a polyvinyl acetate, a poly (ethylene-vinyl acetate), an acrylic polymer, a styrene acrylic polymer, a styrene butadiene polymer, a urea formaldehyde polymer, a melamine formaldehyde polymer, a phenol formaldehyde polymer, or combinations thereof. In various embodiments, a polyisocyanurate foam board can include at least one facer, wherein the at least one facer comprises a composite nonwoven mat according to the present disclosure. In various embodiments, a flooring material can include a composite nonwoven mat according to the present disclosure. In various embodiments, the fibers have an average fiber diameter of 5.5 microns to 20 microns. In various embodiments, the fibers have an average fiber basis weight of 10 g/m² to 100 g/m². In various embodiments, the fibers have an average fiber thickness of 0.25 mm to 2 mm. In various embodiments, the fibers have an average fiber length of 6.35 mm to 50.8 mm. In various embodiments, the nonwoven base layer has an uncoated basis weight of 65 g/m² to 75 g/m². In various embodiments, the composite nonwoven mat has a basis weight of 100 g/m² to 150 g/m². In various embodiments, the composite nonwoven mat has a loss on ignition of 15%-75%. In various embodiments, the coating layer has viscosity of 500 cP to 20,000 cP. In various embodiments, the coating layer has a coat weight of 25 g/m² to 75 g/m².

In various embodiments, a method of making a composite nonwoven mat is provided. The method can include conveying a nonwoven base layer having a first surface and a second surface; applying a coating composition to the first surface of the nonwoven base layer to form a coating layer on the nonwoven base layer; and heating the coated nonwoven mat to form the composite nonwoven mat. In various embodiments, the coating composition can include a polymer material in a carrier composition. In various embodiments, the heating of the coated nonwoven mat can include melting the coating composition onto the first surface of the nonwoven base layer. In various embodiments, the fibers can include glass fibers. In various embodiments, the second surface of the nonwoven base layer is free of the coating layer. In various embodiments, the composite nonwoven mat has a Gurley porosity of at least 500 seconds. In various embodiments, the polymer material can include one or more of a polyolefin, a polyester, a polyamide, a polyimide, a polyacrylate, and a polyurethane, and the carrier composition can include polyvinyl alcohol.

BRIEF DESCRIPTION OF THE DRAWINGS

The subject matter of the present disclosure is particularly pointed out and distinctly claimed in the concluding portion of the specification. A more complete understanding of the disclosure, however, may best be obtained by referring to the detailed description and claims when considered in connection with the FIGURES, wherein like numerals denote like elements.

FIG. 1 illustrates a cross-sectional view of an exemplary embodiment of a composite nonwoven mat of the present disclosure.

DETAILED DESCRIPTION

Unless otherwise defined, all technical and scientific terms used herein have the same meaning as commonly understood by one of ordinary skill in the art to which this application pertains. Although other methods and materials similar or equivalent to those described herein may be used in the practice or testing of the exemplary embodiments, exemplary suitable methods and materials are described below. In case of conflict, the present specification including definitions will control. In addition, the materials, methods, and examples are illustrative only and not intended to be limiting of the general inventive concepts.

The terminology as set forth herein is for description of the exemplary embodiments only and should not be construed as limiting the application as a whole. Unless otherwise specified, "a," "an," "the," and "at least one" are used interchangeably. Furthermore, as used in the description of the application and the appended claims, the singular forms "a," "an," and "the" are inclusive of their plural forms, unless contradicted by the context surrounding such.

Unless otherwise indicated, all numbers expressing quantities used in the specification and claims are to be understood as being modified in all instances by the term "about." The term "about" means within +/−10% of a value, or in some instances, within +/−5% of a value, and in some instances within +/−1% of a value.

To the extent that the term "includes" or "including" is used in the description or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." Thus, use of the term "or" herein is the inclusive, and not the exclusive use.

The terms "binder," "binder composition," and "curable composition," as used herein, are used interchangeably and refer to a material that holds one or more components of a nonwoven article together. Those of ordinary skill in the art will understand that a binder composition is often an aqueous mixture or solution of dissolved ingredients that cures to interconnect fibers together.

The terms "binder solids" or "binder components," as used herein, are used interchangeably and refer to the functional ingredients of the binder composition prior to addition or mixing with water to form the ultimate binder for application to the inorganic fibers.

The terms "nonwoven," "mat," "veil," and "facer" are used interchangeably herein and refer to a bound web of fibers.

While the general inventive concepts are susceptible of embodiment in many different forms, there are shown in the drawings, and will be described herein in detail, specific embodiments thereof with the understanding that the present disclosure is to be considered as an exemplification of the principles of the general inventive concepts. Accordingly, the general inventive concepts are not intended to be limited to the specific embodiments illustrated herein.

Unless otherwise indicated, any element, property, feature, or combination of elements, properties, and features, may be used in any embodiment disclosed herein, regardless of whether the element, property, feature, or combination of elements, properties, and features was explicitly disclosed in the embodiment. It will be readily understood that features described in relation to any particular aspect described herein may be applicable to other aspects described herein provided the features are compatible with that aspect. In particular: features described herein in relation to the composite nonwoven mat may be applicable to the method and vice versa.

The general inventive concepts relate to a composite nonwoven mat and methods of making a composite nonwoven mat. The composite nonwoven mat generally includes a coating layer that reduces the porosity of the nonwoven mat. The coating layer includes a coating composition of polymer material or polymer particles suspended in a carrier composition. The polymer material or particles may be in the form of a powder, such as, for example, a thermoplastic powder, and the carrier composition may be polyvinyl alcohol. The coating composition may be deposited onto a nonwoven base layer formed from a plurality of fibers held together by a binder. In some exemplary embodiments, the coating layer provides an impervious (e.g., water impervious), or substantially impervious barrier such that when a material, particularly a liquid material, is applied to a surface of the composite nonwoven mat opposite the coating layer, the material is at least partially hindered from passing through the composite nonwoven mat by the coating layer.

In one exemplary embodiment, a composite nonwoven mat 100 is provided. Referring to FIG. 1, the composite nonwoven mat 100 comprises a nonwoven base layer 10 having a first surface 12 and a second surface 14. The nonwoven base layer 10 of the present disclosure may be formed by a variety of processes, including wet-laid processes and dry-laid processes. In certain embodiments, the nonwoven base layer 10 is formed by a wet-laid process, which involves forming an aqueous slurry of discrete fibers in a mix tank filled with various components (sometimes referred to as white water), such as water, surfactants, viscosity modifiers, defoaming agents, lubricants, biocides, and/or other chemical agents. Agitation of the white water promotes dispersion of the fibers (e.g., chopped glass fibers) therein, to form a chopped glass fiber slurry. It is desirable that the slurry is agitated sufficiently to achieve a uniform or nearly uniform dispersion of the fibers.

The aqueous fiber dispersion or slurry may then be processed into a wet-laid mat according to any number of conventional methods known in the art. For example, the aqueous fiber slurry is deposited onto a moving screen or conveyor, on which the majority of the water drains through, leaving a randomly oriented fiber web. The fiber web may be further dried by a vacuum slot or other drying means. A binder composition may then be applied to the fiber web in a conventional manner, such as by curtain coating, spraying, twin wire dip bath, two roll padder, and the like. Water and excess binder composition may then be removed by a vacuum or other water removal means.

Finally, the fiber product may be dried and cured in one or more ovens. An exemplary temperature range for drying is from 350° F. (177° C.) to 600° F. (316° C.). The dried and cured product is the finished nonwoven base layer 10.

The nonwoven base layer 10 of the present disclosure may be formed from a variety of materials. In general, the nonwoven base layer 10 comprises a plurality of fibers and a binder composition that binds the fibers together. Exemplary fibers for forming the nonwoven base layer 10 include, but are not limited to, glass fibers, synthetic fibers (e.g., polyester fibers, polyethylene fibers, polypropylene fibers, polyethylene terephthalate fibers, polyamide fibers, aramid fibers, polyaramid fibers), mineral fibers, carbon fibers, ceramic fibers, natural fibers (e.g., cellulose fibers, cotton fibers, jute fibers, bamboo fibers, ramie fibers, bagasse fibers, hemp fibers, coir fibers, linen fibers, kenaf fibers, sisal fibers, flax fibers, henequen fibers), or a blend of two or more different types of fibers.

In certain embodiments, the nonwoven base layer 10 comprises glass fibers. The glass fibers can be made from any type of glass. Exemplary glass fibers include, but are not limited to, A-type glass fibers, C-type glass fibers, E-type glass fibers, S-type glass fibers, ECR-type glass fibers (e.g., Advantex® glass fibers commercially available from Owens Corning of Toledo, Ohio), Hiper-Tex® glass fibers, wool glass fibers, and combinations thereof.

The glass fibers used to form the nonwoven base layer 10 may have a variety of fiber diameters. In certain embodiments, the glass fibers used to form the nonwoven base layer 10 have an average fiber diameter of 5.5 microns to 20 microns. In certain embodiments, the glass fibers used to form the nonwoven base layer 10 have an average fiber diameter of 3 microns to 18 microns. In certain embodiments, the glass fibers used to form the nonwoven base layer 10 have an average fiber diameter of 6 microns to 16 microns. In certain other embodiments, the glass fibers used to form the nonwoven base layer 10 have an average fiber diameter of 11 microns to 13 microns. It is also contemplated that a blend of glass fibers having different fiber diameters, such as a blend of smaller diameter glass fibers (e.g., average fiber diameter of 5.5 microns to 10 microns) and larger diameter glass fibers (e.g., average fiber diameter of 13 microns to 16 microns), may be used to form the nonwoven base layer 10.

The glass fibers used to form the nonwoven base layer 10 may also have a variety of fiber lengths. In certain embodiments, the glass fibers used to form the nonwoven base layer 10 have an average fiber length of 6.35 mm to 50.8 mm. In certain embodiments, the glass fibers used to form the nonwoven base layer 10 have an average fiber length of 12.7 mm to 38.1 mm. In certain other embodiments, the glass fibers used to form the nonwoven base layer 10 have an average fiber length of 19.05 mm to 25.4 mm. It is also contemplated that a blend of glass fibers having different fiber lengths, such as a blend of shorter glass fibers (e.g., average fiber length of 6.35 mm to 12.7 mm) and longer glass fibers (e.g., average fiber length of 19.05 mm to 31.75 mm), may be used to form the nonwoven base layer 10.

As mentioned above, the nonwoven base layer 10 also includes a binder composition to bind the fibers of the nonwoven base layer 10 together. Any conventional binder composition used to form nonwoven mats may be used to form the nonwoven base layer 10 of the present disclosure. In certain embodiments, the nonwoven base layer 10 comprises from 1% to 30% by weight binder composition, based on the total weight of the nonwoven base layer 10. In certain embodiments, the nonwoven base layer 10 comprises from 5% to 27% by weight binder composition, including from 10% to 25% by weight binder composition, and also including from 15% to 23% by weight binder composition, based on the total weight of the nonwoven base layer 10. As one of skill in the art will appreciate, the amount of binder composition used to form the nonwoven base layer 10 may be determined by measuring loss on ignition.

In certain embodiments, the binder composition comprises a binder resin material, a coupling agent, and one or more optional additives. The binder resin may be a thermoset material, a thermoplastic material, or a mixture of a thermoset material and a thermoplastic material. In some exemplary embodiments, the binder resin material comprises any of an acrylic material, styrene-acrylic material, styrene butadiene, a urea formaldehyde material, a melamine formaldehyde material, or a combination of the two materials. In some exemplary embodiments, the acrylic material is polyacrylic acid, such as low molecular weight polyacrylic acid with a weight average molecular weight at or below 10,000 Daltons.

In certain embodiments, the binder resin may be present in the binder composition in an amount of 90% to 99% based on the total weight of the binder composition. In certain other embodiments, the binder resin may be present in the binder composition in an amount of 97% to 99% based on the total weight of the binder composition.

The binder composition may further include a coupling agent. It is to be appreciated that the coupling agents described herein are exemplary in nature, and any suitable coupling agent known to those of ordinary skill in the art may be utilized in any of the exemplary embodiments described or otherwise suggested herein. In certain embodiments, the coupling agent, or coupling agents, may be present in the binder composition in an amount of 0.05% to 10% based on the total weight of the binder composition. In certain embodiments, the coupling agent, or coupling agents, may be present in the binder composition in an amount of 0.1% to 3% based on the total weight of the binder composition. In certain embodiments, the coupling agent, or coupling agents, may be present in the binder composition in an amount of 0.15% to 0.5% based on the total weight of the binder composition.

In certain embodiments, at least one of the coupling agents is a silane coupling agent. Suitable silane coupling agents may include silanes containing one or more nitrogen atoms that have one or more functional groups such as amine (primary, secondary, tertiary, and quaternary), amino, imino, amido, imido, ureido, or isocyanato. Suitable silane coupling agents may also include, but are not limited to, aminosilanes, silane esters, vinyl silanes, methacryloxy silanes, epoxy silanes, sulfur silanes, ureido silanes, and isocyanato silanes. Specific, non-limiting examples of silane coupling agents for use in the instant invention include γ-methacryloxypropyl-trimethoxysilane (A-174), γ-aminopropyltriethoxysilane (A-1100), n-phenyl-γ-aminopropyltrimethoxysilane (Y-9669), n-trimethoxy-silyl-propyl-ethylene-diamine (A-1120), methyl-trichlorosilane (A-154), γ-chloropropyl-trimethoxy-silane (A-143), vinyl-triacetoxysilane (A-188), and methyltrimethoxysilane (A-1630).

The binder composition used to form the nonwoven base layer 10 of the present disclosure may optionally include additional components such as, for example, dyes, oils, fillers, colorants, aqueous dispersions, UV stabilizers, lubricants, wetting agents, surfactants, viscosity modifiers, and/or antistatic agents. Such additives may be included in the binder composition in an amount of 0% percent to 10% based on the total weight of the binder composition.

In certain embodiments, the binder composition used to form the nonwoven base layer 10 of the present disclosure may include water to dissolve or disperse the functional components for application onto the fibers. Water may be added in an amount sufficient to dilute the aqueous binder composition to a viscosity that is suitable for its application to the fibers.

The nonwoven base layer 10 of the present disclosure may have a wide range of basis weights (uncoated). In certain embodiments, the nonwoven base layer 10 has an uncoated basis weight of 25 g/m² to 300 g/m². In certain other embodiments, the nonwoven base layer 10 has an uncoated basis weight of 30 g/m² to 200 g/m². In still other embodiments, the nonwoven base layer 10 has an uncoated basis weight of 40 g/m² to 150 g/m², including an uncoated basis weight of 50 g/m² to 100 g/m², an uncoated basis weight of 55 g/m² to 80 g/m², and also including an uncoated basis weight of 65 g/m² to 75 g/m². In still other embodiments, the nonwoven base layer 10 has an uncoated basis weight of 73 g/m².

The nonwoven base layer 10 of the present disclosure may also have a variety of thicknesses. In certain embodiments, the nonwoven base layer 10 has a thickness of 0.25 mm to 2 mm. In certain other embodiments, the nonwoven base layer 10 has a thickness of 0.3 mm to 0.7 mm. In still other embodiments, the nonwoven base layer 10 has a thickness of 0.3 mm to 0.6 mm. In certain embodiments, the nonwoven base layer 10 has a thickness of 0.75 mm to 2 mm, including a thickness of 1 mm to 2 mm, a thickness of 1.25 mm to 1.9 mm, and also including a thickness of 1.5 mm to 1.8 mm.

Referring again to FIG. 1, the composite nonwoven mat 100 includes a coating layer 20 comprising a coating composition adhered to the first surface 12 of the nonwoven base layer 10. The coating layer 20 is preferably applied to the first surface 12 of the nonwoven base layer 10 using a coating process, as described in further detail below.

As seen in FIG. 1, the coating layer 20 extends partially into the nonwoven base layer 10 (i.e., partially through a thickness of the nonwoven base layer 10 measured from the first surface 12 to the second surface 14). In certain embodiments, the coating layer 20 may extend into the nonwoven base layer 10 in an amount of up to 75% of the thickness of nonwoven base layer 10 (measured from the first surface 12 to the second surface 14). In certain embodiments, the coating layer 20 may extend into the nonwoven base layer 10 in an amount of up to 50% of the thickness of nonwoven base layer 10 (measured from the first surface 12 to the second surface 14). In certain embodiments, the coating layer 20 may extend into the nonwoven base layer 10 in an amount of 10% to 50% of the thickness of nonwoven base layer 10 (measured from the first surface 12 to the second surface 14), and also including from 5% to 25% of the thickness of nonwoven base layer 10 (measured from the first surface 12 to the second surface 14). In certain embodiments, the second surface 14 of the nonwoven base layer 10 is free of a coating composition. It should be appreciated that the thickness to which the coating layer 20 extends into the nonwoven base layer 10 may vary somewhat along the width and/or length of the nonwoven base layer 10.

The coating layer 20 comprises a coating composition that includes polymer material or particles suspended in a carrier composition. The polymer material or particles may be in the form of a powder, such as, a thermoplastic powder. It has been surprisingly discovered that polymer particles can be suspended in particular carrier compositions without the use of dispersants, rheology modification agents, or viscosity modification agents. This can be because the concentration and composition of the particular carrier compositions can alter or regulate the dispersing ability and/or viscosity of the coating layer.

A variety of polymer materials may be used to form the of the present disclosure. The polymer materials may be homopolymers or copolymers obtained from a variety of monomers. In certain embodiments, the coating layer 20 comprises one or more of a polyolefin, a polyester, a polyamide, a polyimide, a polyacrylate, and a polyurethane. In certain embodiments, the coating composition comprises one or more of a polyethylene, a polypropylene, and a polymethacrylate. In certain embodiments, the coating composition comprises a polyethylene selected from high-density polyethylene, medium-density polyethylene, linear low-density polyethylene, low-density polyethylene, very-low-density polyethylene, and combinations thereof. The polymer materials used to form the coating composition of the present disclosure may also include blends of various homopolymers, copolymers, or both homopolymers and copolymers.

The carrier composition for producing the aqueous dispersion can include, for example, polyvinyl alcohol, polyvinyl acetate, styrene butadiene, polyvinyl pyrrolidone, polyacrylic acid, polyvinyl acetate, poly (ethylene-vinyl acetate), acrylic polymers, styrene acrylic polymers, styrene butadiene polymers, urea formaldehyde polymers, melamine formaldehyde polymers, and phenol formaldehyde polymers, or combinations thereof.

The polymer material may represent at least 1% by weight to 50% by weight of the of the coating composition. In one or more embodiments, the polymer material may represent 5% by weight to 25% by weight of the of the coating composition. In one or more embodiments, the polymer material may represent 10% by weight to 20% by weight of the of the coating composition. In one or more embodiments, the polymer material may represent 15% by weight of the coating composition.

The polymer material can be added to the carrier composition prior to application of the coating composition to the first surface 12 of the nonwoven base layer 10. In one or more embodiments, the coating composition may include 2% to 20% carrier composition, in other embodiments, 4% to 15% carrier composition, 5% to 10% carrier composition, based on the weight of the total solids in the coating composition.

The coating layer 20 of the present disclosure may also have a variety of viscosities. In certain embodiments, the coating layer 20 has a viscosity of 250 cP (centipoise) to 25,000 cP. In certain embodiments, the coating layer 20 has a viscosity of 500 cP to 20,000 cP. In certain embodiments, the coating layer 20 has a viscosity of 1000 cP to 15,000 cP. In certain embodiments, the coating layer 20 has a viscosity of 5000 cP to 10,000 cP. In certain embodiments, the coating layer 20 has a viscosity of 7000 cP to 8,000 cP.

The coating composition of the present disclosure may optionally include one or more additives. Exemplary additives include, but are not limited to, fire retardants, dyes, pigments, UV stabilizers, anti-static agents, film forming agents, and so forth. Such additives are well known by those of ordinary skill in the art. Exemplary fire retardants may include, mineral based (ATH, magnesium hydroxide), halogen based, (TCPP), phosphorus based (APP), and intumescent (expandable graphite) fire retardants. In various embodiments, the mineral based (ATH, magnesium hydroxide) and intumescent (expandable graphite) fire retardants in the coating composition represent 0 to 40% by weight of the coating composition. In various embodiments, the mineral based (ATH, magnesium hydroxide) and intumescent (expandable graphite) fire retardants in the coating composition represent 5% to 30% by weight of the coating composition, including 15% to 25% by weight of the coating composition.

In one or more embodiments, the coating composition contains one or more conventional, inorganic mineral fillers, including, but not limited to, ground limestone (calcium carbonate), clay (kaolin), sand, mica, talc, gypsum (calcium sulfate dihydrate), aluminum trihydrate (ATH), vermiculite, antimony oxide, or a combination of any two or more of these substances. In various embodiments, the fillers represent 5% to 98% by weight of the coating composition. In various embodiments, the fillers represent 15% to 95% by weight of the coating composition. In various embodiments, the fillers represent 25% to 93% by weight of the coating composition. In various embodiments, the fillers represent 30% to 90% by weight of the coating composition. In various embodiments, the fillers represent 45% to 85% by weight of the coating composition.

In one or more embodiments, the coating composition is free of conventional, inorganic mineral fillers or essentially free of conventional, inorganic mineral fillers, including, but not limited to, ground limestone (calcium carbonate), clay (kaolin), sand, mica, talc, gypsum (calcium sulfate dihydrate), aluminum trihydrate (ATH), vermiculite, antimony oxide, or a combination of any two or more of these substances. By "essentially free" it is meant that the coating composition includes no more than 5.0% by weight of fillers, including no more than 3.0% by weight, no more than 2.0% by weight, no more than 1.5% by weight, and no more than 1.0% by weight of fillers.

The coating layer 20 of the present disclosure may be applied in a wide range of coat weights. In certain embodiments, the coating layer 20 has a coat weight of 10 g/m² to 200 g/m². In certain other embodiments, the coating layer 20 has a coat weight of 25 g/m² to 150 g/m². In still other embodiments, the coating layer 20 has a coat weight of 50 g/m² to 100 g/m², including a coat weight of 20 g/m² to 80 g/m², and also including a coat weight of 25 g/m² to 75 g/m².

The coating layer 20 of the present disclosure may also have a variety of thicknesses. In certain embodiments, the coating layer 20 has a thickness of 1 micron to 500 microns. In certain other embodiments, the coating layer 20 has a thickness of 5 microns to 250 microns. In still other embodiments, the coating layer 20 has a thickness of 10 microns to 200 microns. In still other embodiments, the coating layer 20 has a thickness of 50 microns to 100 microns.

The coating composition may be deposited onto a nonwoven base layer formed from a plurality of fibers held together by a binder. The coating composition may be deposited using a variety of methods. The coating composition may be deposited using methods including knife over plate via dipping bath or knife over roll via dipping bath. Other suitable methods include, but are not limited to, waterfall coating, curtain coating, fountain coating, impregnation coating, brush coating, and spray coating.

The coating layer 20 functions to substantially close off or seal one surface of the composite nonwoven mat 100 of the present disclosure. Thus, the composite nonwoven mat 100 of the present disclosure includes one surface that is porous and permits wetting or penetration by a liquid/flowable material and an opposing surface that is at least substantially sealed to prevent bleed-through of the liquid/flowable material.

Due to the at least substantially closed-off or sealed surface provided by the coating layer 20, the composite nonwoven mat 100 is generally resistant to a liquid bleeding through the mat. The impervious nature of the composite nonwoven mat 100 of the present disclosure may be characterized by its Gurley porosity. Gurley porosity is a measure of the resistance of a material to air permeability. It may be measured in accordance with TAPPI T-460 (Gurley method), or similar methods. This test measures the time required for 100 cubic centimeters of air to be pushed through an approximately 6.45 cm² (1 in²) circular area of sample under a pressure of approximately 1.22 kPa. The result is expressed in seconds and is frequently referred to as Gurley seconds. As the Gurley porosity increases, permeability decreases, and as Gurley porosity decreases, permeability increases. The composite nonwoven mat 100 of the present disclosure generally has an average Gurley porosity of at least 500 seconds. In certain embodiments, the composite nonwoven mat 100 of the present disclosure has an average Gurley porosity of 300 seconds to 30,000 seconds, including an average Gurley porosity of 500 seconds to 20,000 seconds, an average Gurley porosity of 1,000 seconds to 17,000 seconds, an average Gurley porosity of 1,100 seconds to 15,000 seconds, an average Gurley porosity of 1,150 seconds to 13,000 seconds, and also including an average Gurley porosity of 12,000 seconds to 12,500 seconds. In certain embodiments, the composite nonwoven mat 100 of the present disclosure has an average Gurley porosity of 1,000 seconds to 10,000 seconds, including an average Gurley porosity of 1,200 seconds to 7,500 seconds, and also including an average Gurley porosity of 2,000 seconds to 5,000 seconds.

The composite nonwoven mat 100 of the present disclosure may have a wide range of basis weights. In certain embodiments, the composite nonwoven base layer 10 has a basis weight of 25 g/m² to 350 g/m². In certain other embodiments, the composite nonwoven base layer 10 has a basis weight of 50 g/m² to 300 g/m². In still other embodiments, the composite nonwoven base layer 10 has a basis weight of 75 g/m² to 200 g/m². In still other embodiments, the composite nonwoven base layer 10 has a basis weight of 100 g/m² to 150 g/m². In still other embodiments, the composite nonwoven base layer 10 has a basis weight of 115 g/m² to 125 g/m².

The amount of binder composition present in the composite nonwoven mats of the present disclosure may be determined by measuring loss on ignition (LOI). The composite nonwoven mat 100 of the present disclosure may have a wide range of LOI. In certain embodiments, the nonwoven base layer 10 has a LOI of 15%-75%. In certain embodiments, the composite nonwoven mat 100 has a LOI of 25%-60%. In certain embodiments, the composite nonwoven mat 100 has a LOI of 30%-50%. In certain embodiments, the composite nonwoven mat 100 has a LOI of 40%-45%.

As mentioned above, the coating layer 20 is adhered to the first surface 12 of the nonwoven base layer 10. The extent to which the coating layer 20 is adhered to the first surface 12 of the nonwoven base layer 10 in the composite nonwoven mat 100 may be measured by peel strength. The peel strength of the composite nonwoven mat 100 of the present disclosure may be tested using an Instron Model 3345 device (available from Instron of Norwood, Massachusetts) to carry out a T-peel test with the following parameters: load cell=100 N; fixture separation=12.7 mm; sample dimension=1" width×6" length (2.54 cm width×15.24 cm length); and displacement rate=5.08 mm/s. In certain embodiments, the peel strength of the composite nonwoven mat 100 of the present disclosure is 140 gram-force to 320 gram-force, including 145 gram-force to 310 gram-force, 150 gram-force to 300 gram-force, 160 gram-force to 250 gram-force, and also including 190 gram-force to 235 gram-force.

Owing to its two different surfaces (i.e., the closed-off/sealed surface and the porous surface), the composite nonwoven mat 100 of the present disclosure may be used in a variety of applications and products. In on one or more embodiments, the composite nonwoven mat 100 may be used as a precoated facer in a construction board, such as, for example, gypsum board, polymeric foam board, or cement board.

As indicated above, the composite nonwoven mat 100 includes a first side and a second side opposite the first side. In one or more embodiments, a construction board may be attached or bound to the second side of the composite nonwoven mat 100. The construction board has the composite nonwoven mat 100 situated on one side of the construction board and the construction board has an opposing side opposite the composite nonwoven mat 100. In one or more embodiments, the opposing side of the construction board may have a second facer that is the same or different than the composite nonwoven mat 100. In one or more embodiments, the second facer is a paper facer, coated paper facer, foil facer, fiber facer, conventional coated fiber facer, or a second composite nonwoven mat, formed in accordance with the present disclosure. In other embodiments, the opposing side of the construction board may not have a facer.

In one or more embodiments, the composite nonwoven mat 100 may be included in a polymeric foam board. The foam board includes a foam core with two opposing sides and at least one composite nonwoven mat 100 situated on one of the opposing sides. Suitable foams for use in the foam board include polyurethane, polystyrene, and polyisocyanurate foams. Polyisocyanurate and polyurethane foam compositions have three major components: a polyfunctional isocyanate compound, a polyol and a blowing agent. When these three components are mixed, along with small amounts of catalysts and surfactants, a heat-generating chemical reaction causes the liquid blowing agent to boil. The resultant blowing agent vapor expands the foam to create gas-filled cells.

In one or more embodiments, the foam may be described by the isocyanate index. Those skilled in the art will appreciate that the isocyanate index is the actual number of isocyanate groups (NCO) used in the foam composition divided by the number of theoretical number of isocyanate groups required to react with the isocyanate redactable groups (polyols and $H_2O$) multiplied by 100. When the number of NCO group equals the number of OH group in a formulation, a stoichiometric NCO:OH ratio of 1.0 is realized and a polyurethane polymer/foam is produced. When the number of NCO groups is significantly more than the number of OH groups in a formulation, the excess isocyanate group reacts with itself under catalytic condition to form isocyanurate linkage and polyisocyanurate foam is produced. Typically, when the foam has an isocyanate index greater than about 200 the foam is considered a polyisocyanurate. An index of between about 250 and about 270, provides at least a 2:1 ratio of NCO groups to OH groups, which has been found to provide an appreciable combination of structure integrity, thermal strength and/or stability, and fire resistance.

As those skilled in the art will appreciate, polyisocyanurate or polyurethane foam may be prepared from separate reaction mixtures, typically refereed to an A-side stream and a B-side stream. The A-side stream includes the polyfunctional isocyanate compound, and the B-side stream includes the components reactive with the polyfunctional isocyanate compound (i.e. the polyol or other molecules that include OH groups). The blowing agent is typically included in the B-side. In one or more embodiments, a foam board that includes a coated facer may be prepared by separately preparing a mixture of B-side reactants and blowing agent and A-side reactants, mixing them to prepare a developing foam, the developing foam is then deposited onto the UV-coated facer. A second facer material (either the UV-coated facer of a different facing material) may optionally be applied to the upper surface of the developing foam. The ultimate size of the resultant foam board may be manipulated by adjusting the height of the moving form, i.e., restrained rise, by adjusting the sides of the moving form to a desired width, and by cutting the continuous foam product to a desired length.

In one or more embodiments, the foam board may be described by the density of the foam material. In one or more embodiments, the foam board may have a density or an average density greater than 6 $lbs/ft^3$. In these or other embodiments, the foam board has a density or an average density of about 6 $lbs/ft^3$ to about 25 $lbs/ft^3$, and in other embodiments about 8 $lbs/ft^3$ to about 23 $lbs/ft^3$. In other embodiments, the foam board may have a density or an average density less than 6 $lbs/ft^3$. In other embodiments, the foam board has a density or an average density of about 1 $lb/ft^3$ to about 6 $lbs/ft^3$, and in other embodiments about 2 $lbs/ft^3$ to about 5 $lbs/ft^3$.

In one or more embodiments, the composite nonwoven mat 100 may be included in in a gypsum board. The gypsum board includes a gypsum core with two opposing sides and at least one composite nonwoven mat situated on one of the opposing sides. Wall boards formed of a gypsum core sandwiched between facing layers are commonly used in the construction industry as internal walls and ceilings for both residential and commercial buildings. Formulations and the design of the gypsum board may be tailored for the specific use desired for the board. In one or more embodiments, the gypsum core includes gypsum, optionally wet chopped glass fibers, water resistant chemicals, binders, accelerants, and low-density fillers. In one or more embodiments, the gypsum board may be prepared by providing a continuous layer of the composite nonwoven mat and depositing a gypsum slurry onto one surface of the composite nonwoven mat (typically the side opposite the coating composition). A second continuous layer of facing material (either the composite nonwoven mat 100 or a different facing material) is then applied to the opposite surface of the gypsum slurry. In this manner, the gypsum slurry is sandwiched between opposing layers of facing material. The sandwiched gypsum slurry is then adjusted to a desired thickness and dried to harden the gypsum core and form a gypsum board. In other embodiments, the application of the second facer is omitted to prepare a board with a single facer. Next, the gypsum board may be cut to predetermined dimensions (e.g., length) for end use.

In another application, the composite nonwoven mat 100 of the present disclosure may be used as a substrate for forming roofing shingles or a roofing underlayment. The coating layer 20 of the composite nonwoven mat 100 will prevent bleed-through of the asphalt/bitumen, whereas the asphalt/bitumen can wet out and bond to the portion of the nonwoven base layer 10 that is uncoated.

In another application, the composite nonwoven mat 100 of the present disclosure may be used as a substrate in the manufacture of flooring materials. For example, flooring products such as carpet tiles and vinyl tiles may have a discontinuous or uneven layer of plastisol or polyvinyl chloride (PVC) on a backing of the tiles due to plastisol or PVC bleed-through in the manufacturing process. The composite nonwoven mat 100 of the present disclosure may be used as a backing or reinforcement for flooring materials that prevents plastisol or PVC bleed-through and provides a smooth surface (via the coating layer 20) and allows plastisol or PVC wetting (via the nonwoven material) to form a strong bond between the composite nonwoven mat 100 and other structural portions of the flooring material, while also providing the flooring material with good dimensional stability and mechanical performance. In another application, the composite nonwoven mat 100 of the present disclosure may be used as a substrate in the manufacture of tile backer boards, including waterproof or light weight polyisocyanurate tile backer boards.

The general inventive concepts further relate to a method of forming a composite nonwoven mat. The method of forming a composite nonwoven mat of the present disclosure comprises: a) depositing an aqueous fiber slurry onto a processing line to form a wet laid mat having a first major surface and a second major surface; b) applying a binder composition to at least one of the first major surface and the second major surface of the wet laid mat; and c) heating the wet laid mat to cure the binder composition, thereby forming the nonwoven mat. Any one or more of the fibers disclosed herein may be used in the methods of the present disclosure. In certain embodiments, the fibers are provided to a conveying apparatus such as a conveyor by a storage container for delivery to a mixing tank that contains various surfactants, viscosity modifiers, defoaming agents, and/or other chemical agents with agitation to disperse the fibers and to form an aqueous fiber slurry.

In accordance with the method of the present disclosure, the fiber slurry is deposited onto a processing line to form a wet laid mat having a first major surface and a second major surface. The processing line may be any suitable formation apparatus capable of forming a wet laid mat including, but not limited to, a moving screen or forming wire on an inclined wire forming machine, wire cylinders, Fourdrinier machines, Stevens former, Roto former, Inver former, or Venti former machines. While on the processing line, a substantial portion of the water from the fiber slurry is removed to form a wet laid mat of enmeshed, randomly oriented fibers. The water may be removed from the wet laid mat by a conventional vacuum or air suction system.

The method of the present disclosure also includes applying the binder composition to at least one of the first surface and the second surface of the wet laid mat. The binder composition may be any of the binder compositions previously described herein. The binder composition may be applied to the wet laid mat using a suitable application method including, but not limited to, a binder wire, a spray applicator, a curtain coater, and a Foulard applicator.

In accordance with the method of the present disclosure, after the binder composition is applied to the wet laid mat, the wet laid mat is heated to remove any residual water and cure the binder composition, thereby forming the nonwoven mat. The step of heating the wet laid mat may be accomplished using any known heating or drying method. Suitable heating methods that may be used in the method of the present disclosure include, but are not limited to, a rotary/thru air dryer or oven, a heated drum dryer, an infrared heating source, a hot air blower, and a microwave emitting source. In certain embodiments, the heating step comprises exposing the wet laid mat having the binder composition applied thereto to a temperature of 150° C. to 250° C. for a time period of up to 45 seconds.

The method of making the composite nonwoven mat also includes applying a coating layer including a coating composition to at least one of the first surface or the second surface of the nonwoven base layer to form a coated nonwoven mat. The coating composition may be applied to the nonwoven mat by conventional coating techniques such as spray coating, Meyer rod coating, slot die coating, blade/knife coating, forward roll coating, reverse roll coating, gravure coating, or curtain coating. The method of making the composite nonwoven mat also includes heating the coated nonwoven mat, thereby forming a finished composite nonwoven mat. The step of heating the coated nonwoven mat can take place in one or more ovens. An exemplary temperature range for drying is from 350° F. (177° C.) to 600° F. (316° C.). The step of heating the coated nonwoven mat can also include melting the coating composition onto the nonwoven base layer, allowing the coating composition to flow and create a more tightly sealed coating with lower porosity.

The method of the present disclosure may be used to make any of the various embodiments of composite nonwoven mats previously described herein. All references to singular characteristics or limitations of the present disclosure shall include the corresponding plural characteristic or limitation, and vice versa, unless otherwise specified or clearly implied to the contrary by the context in which the reference is made.

All combinations of method or process steps as used herein can be performed in any order, unless otherwise specified or clearly implied to the contrary by the context in which the referenced combination is made.

All ranges and parameters, including but not limited to percentages, parts, and ratios, disclosed herein are understood to encompass any and all sub-ranges assumed and subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more (e.g., 1 to 6.1), and ending with a maximum value of 10 or less (e.g., 2.3 to 9.4, 3 to 8, 4 to 7), and finally to each number 1, 2, 3, 4, 5, 6, 7, 8, 9, and 10 contained within the range.

The composite nonwoven mats of the present disclosure can comprise, consist of, or consist essentially of the essential elements and limitations of the disclosure as described herein, as well as any additional or optional components or limitations described herein or otherwise useful in nonwoven mat applications.

In some embodiments, it may be possible to utilize the various inventive concepts in combination with one another. Additionally, any particular element recited as relating to a particularly disclosed embodiment should be interpreted as available for use with all disclosed embodiments, unless incorporation of the particular element would be contradictory to the express terms of the embodiment. Additional advantages and modifications will be readily apparent to those skilled in the art. Therefore, the disclosure, in its broader aspects, is not limited to the specific details presented therein, the representative apparatus, or the illustrative examples shown and described. Accordingly, departures may be made from such details without departing from the spirit or scope of the general inventive concepts.

The scope of the general inventive concepts presented herein are not intended to be limited to the particular exemplary embodiments shown and described herein. From the disclosure given, those skilled in the art will not only understand the general inventive concepts and their attendant advantages, but will also find apparent various changes and modifications to the devices, systems, and methods disclosed. It is sought, therefore, to cover all such changes and modifications as fall within the spirit and scope of the general inventive concepts, as described and/or claimed herein, and any equivalents thereof.

The following paragraphs provide further exemplary embodiments.

Paragraph 1. A composite nonwoven mat comprising:
a nonwoven base layer formed from a plurality of fibers held together by a binder, the nonwoven base layer having a first surface and a second surface; and
a coating layer adhered to the first surface, wherein the coating layer comprises a coating composition, the coating composition comprising a polymer material in a carrier composition,
wherein the coating layer extends partially into the nonwoven base layer, and
wherein the composite nonwoven mat has an average Gurley porosity of at least 500 seconds.

Paragraph 2. The composite nonwoven mat of paragraph 1, wherein the fibers comprise glass fibers.

Paragraph 3. The composite nonwoven mat of paragraph 1 or paragraph 2, wherein the fibers have an average fiber thickness of 0.25 mm to 2 mm.

Paragraph 4. The composite nonwoven mat of any one of paragraphs 1 to 3, wherein the fibers have an average fiber basis weight of 10 g/m$^2$ to 100 g/m$^2$.

Paragraph 5. The composite nonwoven mat of any one of paragraphs 1 to 4, wherein the fibers have an average fiber diameter of 5.5 microns to 20 microns.

Paragraph 6. The composite nonwoven mat of any one of paragraphs 1 to 5, wherein the fibers have an average fiber length of 6.35 mm to 50.8 mm.

Paragraph 7. The composite nonwoven mat of any one of paragraphs 1 to 6, wherein the nonwoven base layer has an uncoated basis weight of 65 g/m$^2$ to 75 g/m$^2$.

Paragraph 8. The composite nonwoven mat of any one of paragraphs 1 to 7, wherein the composite nonwoven mat comprises a basis weight of 100 g/m$^2$ to 150 g/m$^2$.

Paragraph 9. The composite nonwoven mat of any one of paragraphs 1 to 8, wherein the composite nonwoven mat comprises a loss on ignition of 15%-75%.

Paragraph 10. The composite nonwoven mat of any one of paragraphs 1 to 9, wherein the coating layer has viscosity of 500 cP to 20,000 cP.

Paragraph 11. The composite nonwoven mat of any one of paragraphs 1 to 10, wherein the coating layer has a coat weight of 25 g/m$^2$ to 75 g/m$^2$.

Paragraph 12. The composite nonwoven mat of any one of paragraphs 1 to 11, wherein the polymer material comprises one or more of a polyolefin, a polyester, a polyamide, a polyimide, a polyacrylate, and a polyurethane.

Paragraph 13. The composite nonwoven mat of any one of paragraphs 1 to 12, wherein the polymer material comprises one or more of a polyethylene, a polypropylene, and a polymethacrylate.

Paragraph 14. The composite nonwoven mat of any one of paragraphs 1 to 13, wherein the carrier composition comprises one or more of a polyvinyl alcohol, a polyvinyl acetate, a styrene butadiene, a polyvinyl pyrrolidone, a polyacrylic acid, a polyvinyl acetate, a poly (ethylene-vinyl acetate), an acrylic polymer, a styrene acrylic polymer, a styrene butadiene polymer, a urea formaldehyde polymer, a melamine formaldehyde polymer, a phenol formaldehyde polymer, or combinations thereof.

Paragraph 15. A polyisocyanurate foam board comprising at least one facer, wherein the at least one facer comprises a composite nonwoven mat according to any of paragraphs 1-14.

Paragraph 16. A method of making a composite nonwoven mat, the method comprising:
providing a nonwoven base layer formed from a plurality of fibers held together by a binder, the nonwoven base layer having a first surface and a second surface;
applying a coating composition to the first surface of the nonwoven base layer to form a coating layer on the nonwoven base layer, wherein the coating composition comprises a polymer material in a carrier composition; and
heating the nonwoven base layer with the coating layer to form the composite nonwoven mat.

Paragraph 17. The method of paragraph 16, wherein the fibers comprise glass fibers.

Paragraph 18. The method of paragraphs 16 or paragraph 17, wherein the second surface of the nonwoven base layer is free of the coating layer.

Paragraph 19. The method of any one of paragraphs 16 to 18, wherein the composite nonwoven mat has a Gurley porosity of at least 500 seconds.

Paragraph 20. The method of any one of paragraphs 16 to 19, wherein the polymer material comprises one or more of a polyolefin, a polyester, a polyamide, a polyimide, a polyacrylate, and a polyurethane, and wherein the carrier composition is polyvinyl alcohol.

What is claimed is:
1. A composite nonwoven mat comprising:
a nonwoven base layer formed from a plurality of glass fibers held together by a binder, the nonwoven base layer having a first surface and a second surface; and
a coating layer adhered to the first surface, wherein the coating layer comprises a coating composition, the coating composition comprising a polymer material in a carrier composition, wherein the polymer material comprises one or more particles of a polyolefin, a polyester, a polyamide, a polyimide, a polyacrylate, and a polyurethane, and wherein the carrier composition comprises one or more of a polyvinyl alcohol, a polyvinyl acetate, a styrene butadiene, a polyvinyl pyrrolidone, a polyacrylic acid, a polyvinyl acetate, a poly (ethylene-vinyl acetate), an acrylic polymer, a styrene acrylic polymer, a styrene butadiene polymer, a urea formaldehyde polymer, a melamine formaldehyde polymer, a phenol formaldehyde polymer, or combinations thereof,
wherein the coating layer extends partially into the nonwoven base layer,
wherein the composite nonwoven mat comprises a loss on ignition of 40%-75%, and
wherein the composite nonwoven mat has an average Gurley porosity of at least 500 seconds.

2. The composite nonwoven mat of claim 1, wherein the nonwoven base layer has a thickness of 0.25 mm to 2 mm.

3. The composite nonwoven mat of claim 1, wherein the glass fibers have an average fiber basis weight of 10 g/m² to 100 g/m².

4. The composite nonwoven mat of claim 1, wherein the glass fibers have an average fiber diameter of 5.5 microns to 20 microns.

5. The composite nonwoven mat of claim 1, wherein the glass fibers have an average fiber length of 6.35 mm to 50.8 mm.

6. The composite nonwoven mat of claim 1, wherein the nonwoven base layer has an uncoated basis weight of 65 g/m² to 75 g/m².

7. The composite nonwoven mat of claim 1, wherein the composite nonwoven mat comprises a basis weight of 100 g/m² to 150 g/m².

8. The composite nonwoven mat of claim 1, wherein the composite nonwoven mat comprises a loss on ignition of 40%-45%.

9. The composite nonwoven mat of claim 1, wherein the coating layer has viscosity of 500 cP to 20,000 cP.

10. The composite nonwoven mat of claim 1, wherein the coating layer has a coat weight of 25 g/m² to 75 g/m².

11. The composite nonwoven mat of claim 1, wherein the polymer material comprises one or more of a polyethylene, a polypropylene, and a polymethacrylate.

12. The composite nonwoven mat of claim 1, wherein the binder comprises a binding resin and a coupling agent.

13. A polyisocyanurate foam board comprising at least one facer, wherein the at least one facer comprises the composite nonwoven mat according to claim 1.

\* \* \* \* \*